J. ROBSON.
POWER TRANSMISSION GEAR.
APPLICATION FILED APR. 26, 1916.
1,243,677.
Patented Oct. 16, 1917.
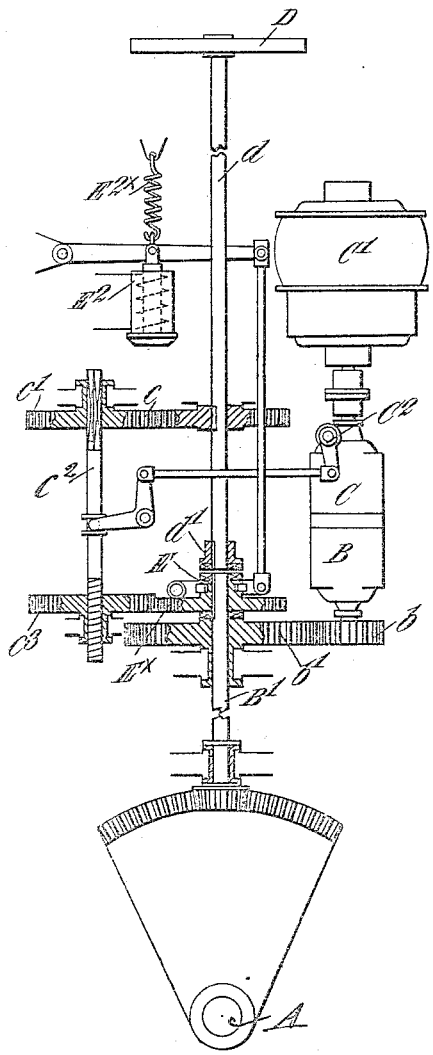
Inventor:
John Robson

UNITED STATES PATENT OFFICE.

JOHN ROBSON, OF WESTMINSTER, LONDON, ENGLAND, ASSIGNOR TO THE VARIABLE SPEED GEAR LIMITED, OF LONDON, ENGLAND.

POWER-TRANSMISSION GEAR.

1,243,677. Specification of Letters Patent. Patented Oct. 16, 1917.

Original application filed February 11, 1915, Serial No. 7,641. Divided and this application filed April 26, 1916. Serial No. 93,598.

*To all whom it may concern:*

Be it known that I, JOHN ROBSON, a subject of the King of Great Britain, residing at Vickers House, Broadway, Westminster, in the county of London, England, have invented certain new and useful Improvements in or Relating to Power-Transmission Gear, of which the following is a specification.

This invention relates to an improvement in or modification of the power transmission gear forming the subject of application for Patent Serial No. 7641 filed February 11, 1915, in which means are provided whereby, in the event of the said gear breaking down, the steering or other hand-wheel will be automatically declutched from the control device of the gear and the latter from the rudder or other member to be operated and the steering wheel will be clutched to the said rudder. In the constructional form of the said means described in the aforesaid specification two interconnected clutches are employed. One of these clutches serves to connect the operating motor with the rudder post or shaft or with the steering wheel and the other serves when the operating motor is in use to connect the said steering wheel with the control device of the motor through a hunting gear by means of which the movement of the operating motor serves to return the control device to the zero position. When the operating motor is not in use, the second mentioned clutch occupies the disengaged position so that on moving the rudder post by hand no displacement of the control device will take place, nor will the hunting gear be operated by the steering wheel or by the rudder post.

According to the present invention the transmission gear is so constructed and arranged that the second mentioned clutch is dispensed with, thus requiring only one clutch to be employed. For this purpose the latter clutch may carry a toothed wheel or segment meshing with or geared to another toothed wheel forming part of the hunting gear and the steering wheel shaft may have rigidly mounted thereon a second toothed wheel meshing with a second toothed wheel of the hunting gear. The first mentioned pair of toothed wheels are so formed that they remain in constant engagement with each other in spite of the sliding movement of the toothed wheel or segment carried by the clutch, so that the hunting gear remains in operation whether the rudder post is being actuated by the steering wheel or by the motor.

In order that the said invention may be clearly understood and readily carried into effect the same will be described more fully with reference to the accompanying drawing which is a diagrammatic plan showing a constructional form of the invention applied to the steering apparatus of a boat.

A is the rudder post. B is the hydraulic motor for actuating the rudder post through gear wheels $b$, $b'$ and the shaft $B'$. C is the variable delivery and reversible pump supplying liquid under pressure to the motor B and $C'$ is the constant speed prime mover for driving the pump C. $C^2$ represents the shaft appertaining to the control device of the pump C, and $d$ is the shaft driven by the steering hand-wheel D.

E represents the aforesaid clutch, $E^2$ represents the solenoid appertaining to this clutch and $e$ represents a rod by which movement is transmitted from the core of the solenoid to the clutch E. The said core is controlled by a spring $E^{2x}$.

$E^x$ represents the aforesaid toothed wheel or segment carried by the clutch E, and $c^3$ represents the toothed wheel meshing therewith or geared thereto, the latter wheel being connected by screw threads to the shaft $c^2$ from which motion is transmitted to the shaft $C^2$ of the control device. $c$ represents the aforesaid toothed wheel rigidly carried by the steering wheel shaft $d$ and $c'$ represents the toothed wheel meshing therewith, the latter wheel being slidably connected to the shaft $c^2$. $d'$ represents a clutch element fixed to the shaft $d$.

When the rudder post is being actuated by power the clutch E occupies the position shown in the drawings; the hunting gear constituted by the shaft $c^2$ and the gear wheels $E^x$, $c^3$, $c'$ and $c$ then operates in substantially the same manner as that described in the aforesaid prior specification. When the rudder post is being operated by the steering wheel the clutch E will be in engagement with the clutch member $d'$ and the control device of the motor then remains stationary owing to the fact that the tendency for the steering wheel shaft $d$ to displace the control device through the hunting gear is nullified by the movement of the toothed wheel or segment $E^x$.

By means of the herein described improvements the number of the parts of the apparatus is reduced, the load on the solenoid $E^2$ for operating the clutch E is diminished as compared with the arrangement in which two clutches are employed, and the hunting gear always remains in its correct relative position when the rudder is being operated manually by the steering hand wheel.

What I claim and desire to secure by Letters Patent of the United States is:—

1. In power transmission gear, the combination with the operating motor, the member normally driven thereby, the control device of said motor, and the hand operated control member normally connected to said device, of a clutch normally connecting said motor to the member driven thereby, means, coming into operation automatically when the power transmission gear breaks down, for moving said clutch to disconnect the motor from the member normally driven thereby and for connecting this member to the hand operated control member, and means whereby the manual movements of the said control member do not affect the position of the control device.

2. In power transmission gear, the combination with the operating motor, the member normally driven thereby, the control device of said motor, and the hand operated control member normally connected to said device through a hunting control gear which is also operated by the member driven by the motor, of a clutch normally connecting said motor to the member driven thereby and constantly connecting this member to the hunting control gear and means coming into operation automatically when the power transmission gear breaks down for moving said clutch to disconnect the motor from the member normally driven thereby and for connecting this member to the hand operated control member, this automatic movement taking place without disconnecting either the control member or the motor driven member from the hunting control gear.

In witness whereof I hereunto affix my signature.

JOHN ROBSON.

Copies of this patent may be obtained for five cents each, by addressing the "Commissioner of Patents, Washington, D. C."